US005873969A

United States Patent [19]

Keith et al.

[11] Patent Number: 5,873,969

[45] Date of Patent: Feb. 23, 1999

[54] METHOD AND APPARATUS FOR OPENING A ZIPPER AFTER IT HAS BEEN SPOT SEALED

[75] Inventors: David Keith; Thomas P. O'Connor, both of Shelbyville, Ind.

[73] Assignee: KCL Corporation, Shelbyville, Ind.

[21] Appl. No.: 916,119

[22] Filed: Aug. 22, 1997

[51] Int. Cl.[6] .............................. B32B 7/04; B29C 47/00

[52] U.S. Cl. ....................... 156/91; 156/244.15; 156/259; 156/277; 156/290; 156/501; 156/510; 156/580; 53/459; 53/468; 493/211

[58] Field of Search ................................ 156/91, 244.15, 156/244.18, 244.19, 259, 277, 290, 500, 501, 510, 580; 53/459, 468; 493/211

[56] References Cited

U.S. PATENT DOCUMENTS

| | | | |
|---|---|---|---|
| Re. 29,208 | 5/1977 | Naito | 156/91 |
| 3,750,365 | 8/1973 | Darby, Jr. et al. | 53/29 |
| 4,846,586 | 7/1989 | Bruno | 383/9 |
| 5,094,707 | 3/1992 | Bruno | 156/244.15 |
| 5,334,127 | 8/1994 | Bruno et al. | 493/194 |
| 5,511,884 | 4/1996 | Bruno et al. | 383/63 |
| 5,672,234 | 9/1997 | Rodenstein et al. | 156/494 |
| 5,783,027 | 7/1998 | Rodenstein et al. | 156/494 |

*Primary Examiner*—James Sells

*Attorney, Agent, or Firm*—Woodard, Emhardt, Naughton, Moriarty & McNett

[57] ABSTRACT

A method and apparatus for manufacturing recloseable plastic bags with engageable mating profiles where the bags are provided open for the consumer. The profiles are initially provided in the fully engaged condition within an elongate, longitudinally cut tube. The profiles are then periodically fused, tacked, or attached together at the approximate locations where the tube is to be cut into bags. Upon tacking, the profiles are pulled apart by frictionally engaging an area on the outside of the film, near the profiles, and between the tacks. The film is then forced away from the profiles, which at least partially pulls one profile from the other. Thereafter, the tube may be cut and sealed into bags as would otherwise normally occur.

22 Claims, 4 Drawing Sheets

METHOD AND APPARATUS FOR OPENING A ZIPPER AFTER IT HAS BEEN SPOT SEALED

This invention relates to a method and an apparatus for manufacturing bags with a mouth that is sealed by interlocking a female rib on one side of the mouth with a male rib on the other and more particular relates to a method and an apparatus that provides these bags already opened for the consumer.

BACKGROUND OF THE INVENTION

Recloseable plastic bags are well-known. They are made by extruding a thin sheet of tubular stock material and attaching or simultaneously extruding a set of mating profiles to the tube. The tube is then cut and sealed to form individual bags. The profiles are positioned along the mouths of the bags and can be repeatedly opened and closed by the user. A commercial example of these bags is available from Dowbrands L. P. under the trademark ZIPLOC®.

U.S. Pat. No. 4,846,586 discloses plastic bags that are formed with a preopened mouth. In other words, the bags are made with profiles that are not interlocked when they are supplied to the consumer. The patent teaches to place one profile on the inside of a flap that folds over the bag's mouth. Once folded, this profile interlocks with a mating profile on the outside of the bag. The principal advantage of an open bag is that a user, such as a deli clerk, can grab the bag and promptly insert goods without wasting time to open it.

U.S. Pat. No. 5,334,127 discloses another method to manufacture preopened bags. This patent discloses the use of a blade that separates the profiles immediately before the extruded tube is cut into individual bags. The patent reads to first place spot welds on each side of the profiles while they are still interlocked and then separate the profiles with a blade that slides between the profiles and plows them apart. The spot welds apparently hold the profiles in position as they are separated, until the sides of the bag are cut and sealed.

The following invention is another solution to supply preopened bags to the consumer.

SUMMARY OF THE INVENTION

In one aspect this patent describes an improved process and/or apparatus to manufacture preopened bags. It is already known how to extrude plastic film in a continuous tube with fastener profiles, flatten the tubing, engage the profiles, and then slit the tubing between the profiles. What the inventor has discovered is a new method and apparatus to open these profiles before the bags are formed. This patent teaches the apparatus and process (a) to periodically secure the engaged profiles together, (b) frictionally engage the film near the profiles, and (c) force the profiles apart between the points where they are secured. Thereafter, the tubing and profiles may be sealed and cut into recloseable bags as would otherwise normally occur.

In another aspect this patent also describes an improved process and/or apparatus to manufacture preopened bags from separately extruded film and profiles. It is already known how to move the flattened film and previously engaged profiles down a common path, longitudinally cut the tube open, and affix the profile within the cut tube. What the inventor has discovered is a new method and apparatus to open these profiles before the bags are formed. This patent teaches the apparatus and process (a) to periodically secure the engaged profiles together, (b) frictionally engage the film near the profiles, and (c) force the profiles apart between the points where they are secured. Thereafter, the tubing and profiles may be sealed and cut into recloseable bags as would otherwise normally occur.

An object of this invention is to provide a new solution to manufacture preopened bags.

A feature of this invention is that it can be added to existing equipment that was not previously designed to manufacture preopened bags.

And an advantage of this invention is that it may be advantageously used in parallel to simultaneously preopen two sets of profiles that are attached to the same film.

DRAWINGS

The nature of this invention can be understood from the attached drawings and the detailed description of the preferred examples that follow. To assist the reader, the same numbers are used in the figures to identify the same or similar structures from one drawing to the next. A complete copy of this patent has 5 figures, in which.

Figure 3:
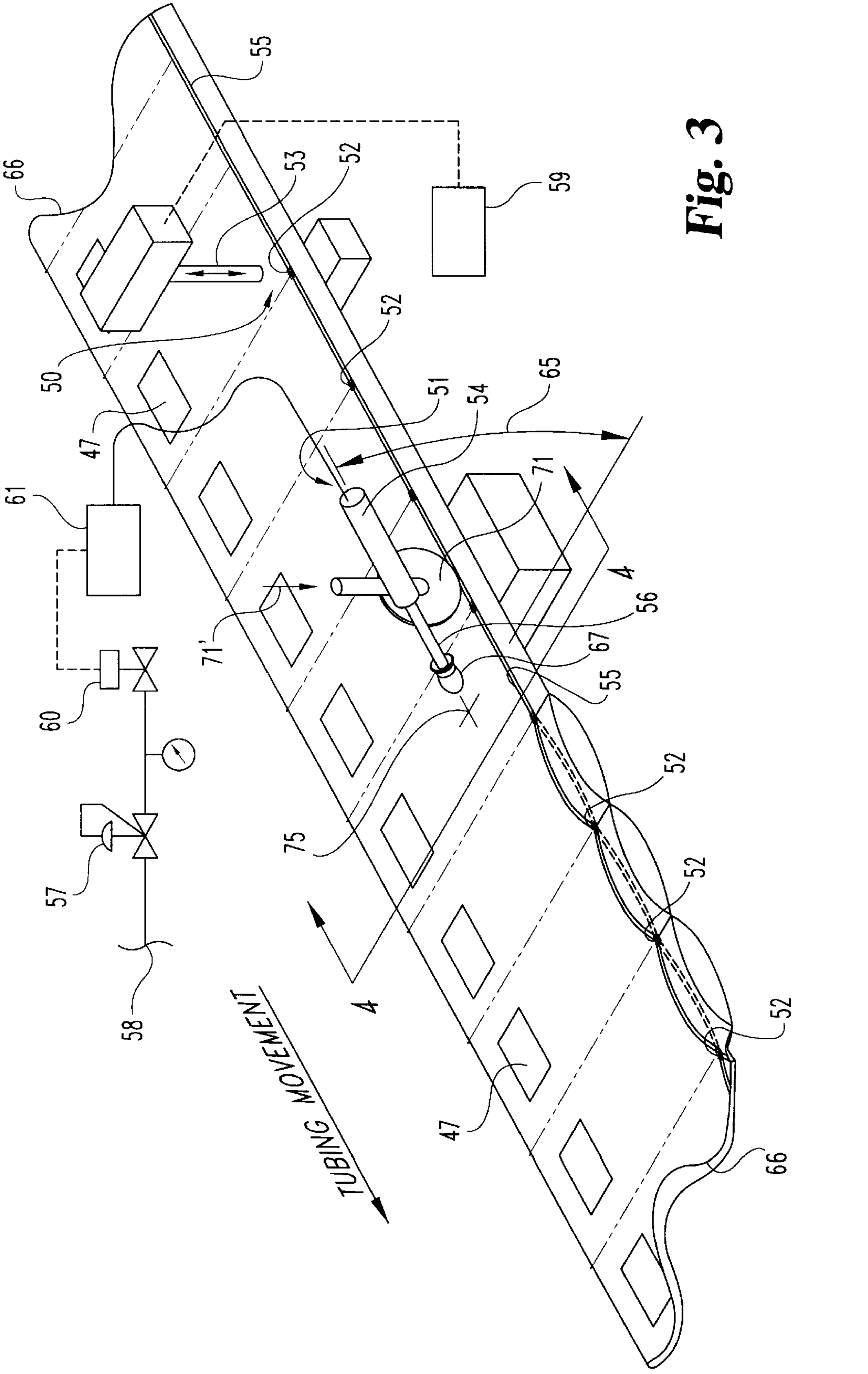
FIGS. 3 and 5 are perspective views that depict different embodiments of the fusing or separating steps according to this patent.
Figure 4:
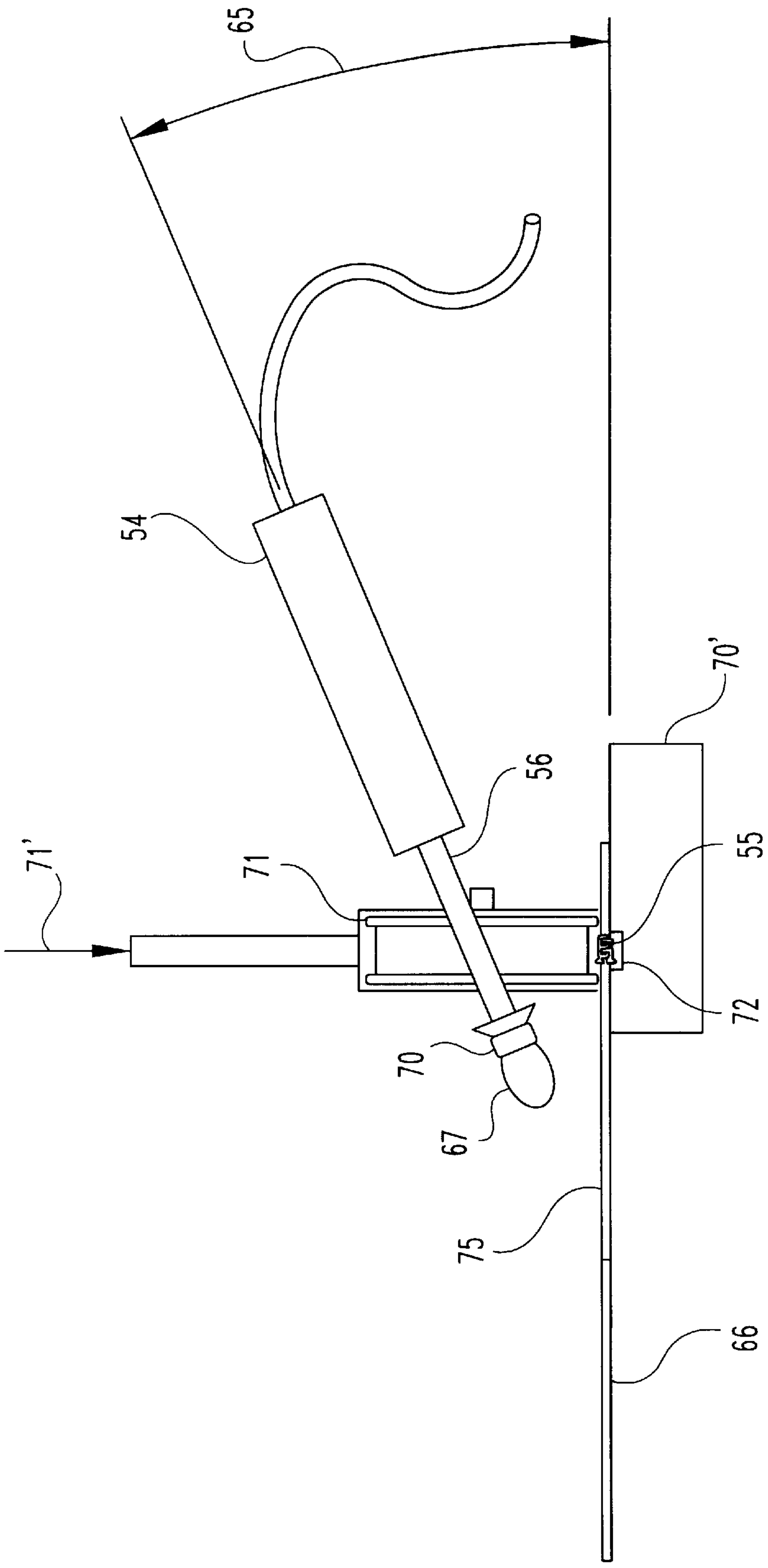

And FIG. 4 depicts a cross-sectional view of the separating step that is depicted in FIG. 3.

DESCRIPTION OF THE INVENTION

We use specific language in the following description to publicly disclose our invention and to convey its principles to others. No limits on the breadth of our patent rights based simply on using specific language are intended. We also include in our rights any alterations and modifications to our description that should normally occur to one of average skill in this technology.

Figure 1:
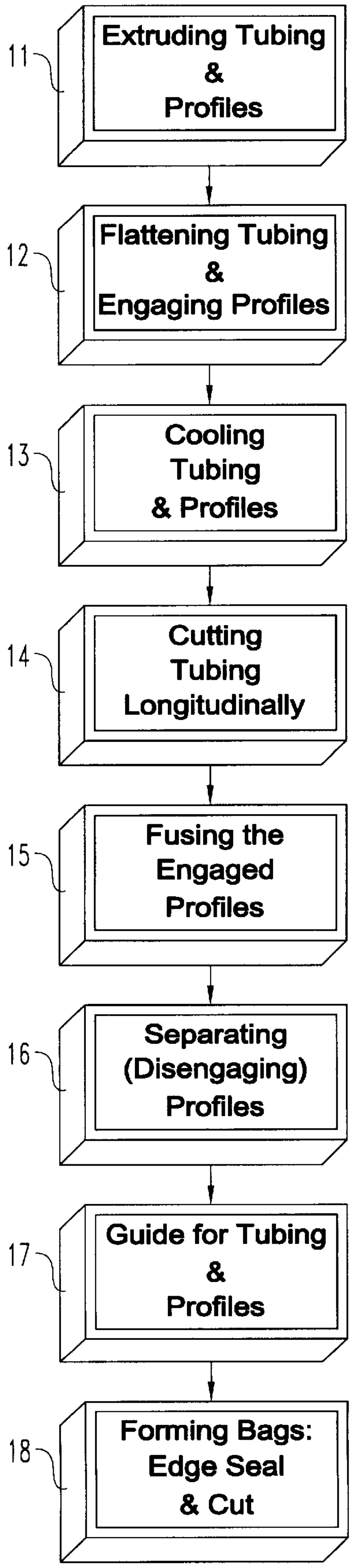
FIGS. 1 and 2 depict steps in the method of making bags according to this patent.

FIG. 1 depicts the entire process to form bags from a film of extruded plastic tubing. Block 11 depicts the well-known process of extruding tubing with recloseable mating profiles. Block 12 depicts the well-known process of flattening the tubing and interlocking or engaging the profiles. Block 13 depicts the well-known process of cooling the profiles while they are interlocked in order to promote a tight seal. And block 14 depicts the well-known process of cutting the tubing down its length in order to create the mouth of the bags. All the foregoing steps and apparatus to perform these steps are well-known in the art, see for example U.S. Pat. No. Re. 29,208 to Naito, the disclosure of which is incorporated into this specification by reference.

The recloseable plastic bags made with these well-known methods have their mating profiles engaged or, in other words, the bags are produced with closed mouths. The present invention makes recloseable plastic bags with the mating, profiles apart or the mouths already open for the consumer to insert goods. And in the practice of this invention, it is preferable that the profiles are of a type that require a force of three pounds or less to be disengaged from each other.

Still referring to FIG. 1, block 15 depicts the first step in the practice of this invention. The engaged profiles are preferably spot fused together prior to the second step of this invention, which is their separation, depicted in block 16. This fusing step and separating step are more fully described later in this specification.

The remainder of FIG. 1 continues with processes that are again well-known. Block 17 depicts the well-known steps for guiding the now cut plastic tubing or film and the profiles through further processing and a cooling mechanism, if required. Block 18 depicts the apparatus and method for forming the bags, which includes the processes for edge sealing and cutting the plastic film into bags. The apparatus for sealing and forming bags in this fashion is again well-known in this technology.

Figure 2:
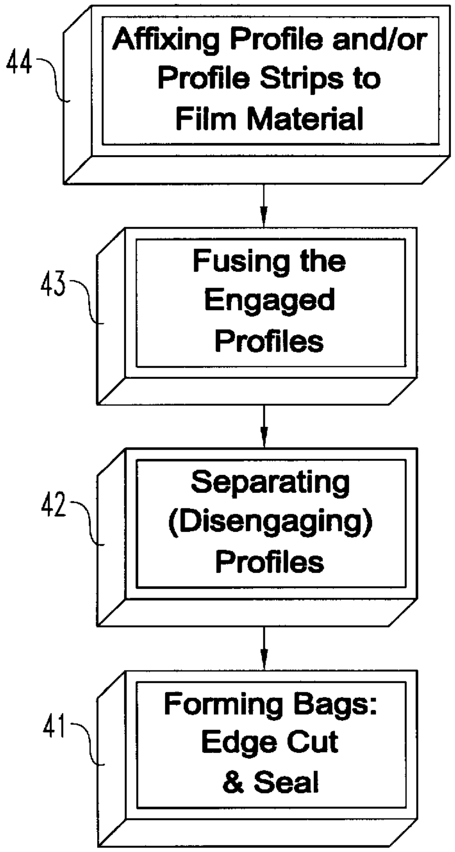

FIG. 2 depicts a process to practice this invention by attaching mating profiles that were extruded separately from the tubing. Block 44 depicts the well-known process and apparatus to adhere previously interlocked profiles to the tubing or film material. Block 43 depicts the first step in the practice of this invention. The engaged profiles are spot fused together preferably prior to the second step of this invention, which is their separation, depicted in block 42. This fusing step and separating step are more fully described later in the specification. Block 41 depicts the well-know process and apparatus for forming the bags by edge sealing and cutting the tubing. An advantage of this method is that one can easily place printing on the outside of the bags, item 47 in FIGS. 3 or 5, with most any well-known process before the bags are formed.

FIG. 3 depicts a preferred embodiment of the apparatus and process to perform the fusing and separating steps of this invention, previously identified in blocks 15 and 16 of FIG. 1 and blocks 43 and 42 of FIG. 2. The fusing step is generally identified at 50 and the separating step is generally identified at 51.

In general, fusing step 50 is preferably performed at some point upstream from separation step 51. The fusing step is preferably performed by periodically welding the interlocked profiles together, commonly known as spot-welding, which creates tacks 52. The tacks are isolated locations where the profiles cannot easily pull apart. These tacks assure that the profiles stay aligned when they are separated in step 51. Hence as a less desirable option, one can also place these tacks near or immediately adjacent the profiles, or even use mechanical fasteners, to also hold the profiles in proper alignment. But regardless, the tacks are preferably placed as close as possible to the exact locations where the bags' sides are eventually cut and sealed. Otherwise, the tacks may prevent the bags from fully opening during use, that is, unless this is a desired result.

The actual machinery and process to perform fusing step 50 is well-known. For example, one can make spot welds with most any ultrasonic or electrical heating device 53 that is capable of fusing these materials together. Optionally, one could also use a mechanical fastener such as a rivet. Or as another option, one could temporarily hold the profiles together at a particular location with a clamp, which is released after the bags' sides are sealed. But whatever the method that is used, it is further preferable that it is automatically controlled 59 in some well-known fashion.

Separating step 51 is also generally identified in FIG. 3. The basic structure is a device to push the bags open, and is presently preferred to be a piston 56 that extends from a cylinder 54. For example and still referring to FIG. 3, one preferred arrangement is activated with pressurized air. The cylinder has a 0.75 inch base and the piston is normally retracted but has a 1–1½ inch stroke non-rotating shaft when it extends from the cylinder. This arrangement is activated by selectively supplying pressurized air to cylinder 54 from valve 60. High-pressure air enters at 58, is dropped to a lower pressure with regulator 57 (presently preferred to be 45 psi) and is then is controlled by automatic valve 60. Using electrical or pneumatic controls 61, valve 60 is programmed or controlled to selectively open only when a set of interlocked profiles 55 is placed in front of piston 56. Preferably, the cylinder is then spring-loaded to return the piston to its retracted state, although, pressurized air may be used for this purpose.

Other devices are also contemplated in the practice of this invention to force the bags open. For example, one could use a liquid instead of air to activate the piston, or one could also use a reciprocating mechanical arm or a wheel that provides the same force to open the bags as piston 56. The wheel or arm would also frictionally engage the outside of the film near profile 55 and pull the film away from the profile, which should at least partially disengage one profile from the other.

FIG. 4 depicts additional details of piston 56 and cylinder 54. Most notably, FIG. 4 depicts the angle 65 that piston 56 strikes film 66. The preferable range is from 30° to 60° from the horizontal, but is presently most preferred to be 45° from the horizontal.

FIG. 4 also depicts tip 67 on piston 56. This tip is made of rubber and is held over the stub end of piston 56 with clamp 70. The preferred materials for tip 67 are commercially available rubber fingertips, which are typically sold to assist office personnel in the handling of paper. A commercial example of these tips is the amber fingertip sold under the trademark SWINGLINE by ACCO U.S.A., Inc., 770 S. ACCO Plaza, Wheeling, Ill. 60090-6070, stock number 54032. It is further preferable that two of these tips are used at a time. For example, it is preferable to place a SWINGLINE number 12 fingertip over the piston's stub shaft and then place a size 13 over the size 12 before clamping them both onto the shaft.

Other prominent structures in FIG. 4 are guide block 70' and wheel 71, which are located immediately upstream of cylinder 54. Guide block 70' is preferably made of a material to resist abrasion, such as nylon, and has a groove 72 that is sized to accept profile 55. Wheel 71 is aligned on top of this groove and is forced down upon profile 55 with a spring 71' or some other structure or weight. In this fashion, wheel 71 and block 70' restrain profile 55 and thereby hold film 66 as tip 67 strikes the film at point 75, which opens profile 55.

Figure 5:
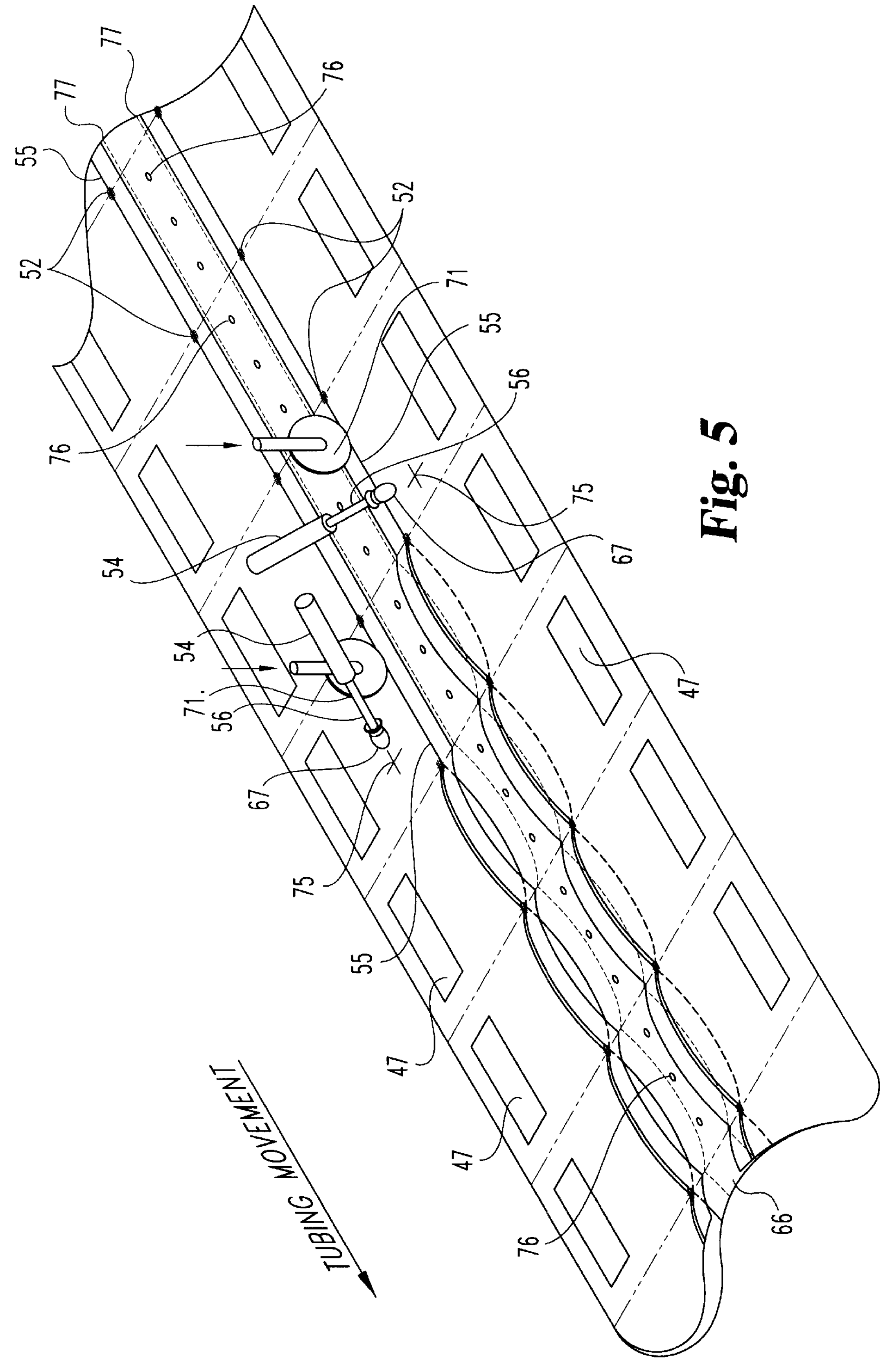

FIG. 5 depicts an alternative embodiment of this invention where the processes depicted in FIGS. 3 and 4 are performed in parallel. A principle feature of this design is that both pistons strike the film simultaneously, which offsets the force of each and helps hold the film in position as it is pulled down the manufacturing line. In this embodiment the bags are preferably separated in pairs. Each pair can be placed upon a set of pins (not shown), which are inserted through holes 76. An individual bag can then be separated from the pins by tearing the bag at serration 77. The processes and machinery to manufacture pairs of bags in this fashion are widely known, except for the steps and apparatus presented in this patent to preopen the bags for the consumer.

The Claims

While we have attempted to illustrate and describe our invention in detail, please consider this as illustrative and not restrictive of our patent rights. The reader should understand that we have only presented our preferred embodiments and that all changes and modifications that come within the spirit of our invention are included if the following claims or the legal equivalent of these claims describes them.

We claim:

1. In a method of making recloseable plastic bags where the bags are made by extruding plastic film as a continuous tube with fastener profiles, moving the tubing along a longitudinal path, flattening the tubing, engaging the profiles to mate and close with each other, and longitudinally slitting the tubing into a U-shape; the improvement comprising:

(a) periodically securing the engaged profiles together as said film moves along said path;

(b) frictionally engaging an area of the film near said profiles; and (c) forcing said film away from said profiles at said area of the film, whereby at least a part of said profiles are disengaged;

and whereby said tubing and profiles may then be sealed and cut to form bags with at least partially disengaged profiles.

2. The method of claim 1 where said periodically securing step is performed by periodically fusing the engaged profiles together.

3. The method of claim 1 where said periodically securing step is performed by mechanically fastening the engaged profiles together.

4. The method of claim 1 where said frictionally engaging step is performed by placing a rubber material against said film.

5. The method of claim 1 where said forcing step is simultaneously performed on two sets of profiles attached to said film.

6. In a method of making recloseable plastic bags that are made from flattened elongated tubing and engaged profiles where the bags are made by moving said tubing and said profiles along a longitudinal path, longitudinally cutting said tubing into a U-shape, and affixing said profiles within said U-shaped film, the improvement comprising:

(a) periodically securing the engaged profiles together as said film moves along said path;

(b) frictionally engaging an area of the film near said profiles; and (c) forcing said film away from said profiles at said area of the film, whereby at least a part of said profiles are disengaged;

and whereby said tubing and profiles may then be scaled and cut to form bags with at least partially disengaged profiles.

7. The method of claim 6 where said frictionally engaging step is performed by placing a rubber material against said film.

8. The method of claim 6 where said periodically securing step is performed by periodically fusing the engaged profiles together.

9. The method of claim 6 where said periodically securing step is performed by mechanically fastening the engaged profiles together.

10. The method of claim 6 where said forcing step is simultaneously performed on two sets of profiles attached to said film.

11. The method of claim 6 including the step of printing information upon said elongated tubing.

12. In an apparatus for making recloseable plastic bags having mating and engageable fastener profiles and the mouth of the bags are at least partially open, said apparatus including means for extruding elongated plastic tubing with mating profiles, means for flattening said tubing, means for engaging said profiles with each other, means for moving said tubing along a longitudinal path, and means for longitudinally cutting said tubing into a U-shape, the improvement comprising:

(a) means for periodically securing the engaged profiles together as said film moves along said path;

(b) means for frictionally engaging an area of the film near said profiles; and (c) means for forcing said film away from said profiles at said area of the film and disengaging at least a portion of said profiles;

whereby said elongated tubing can be subsequently sealed and cut into bags with at least partially open mouths.

13. The improved apparatus of claim 11 where the means for periodically securing is a means for fusing the engaged profiles together.

14. The improved apparatus of claim 11 where the means for periodically securing is a means for mechanically fastening the engaged profiles together.

15. The improved apparatus of claim 11 where the means for frictionally engaging is a rubber tip.

16. The improved apparatus of claim 11 where the means for forcing is a piston and cylinder.

17. In an apparatus for making recloseable plastic bags from a continuous tube of plastic material and at least one strip of engaged profiles where the mouths of the bags are at least partially open, said apparatus including means for guiding said tube and said strip along a longitudinal path, means for longitudinally cutting said tubing into a U-shape, and means for attaching said strip within said U-shaped film, the improvement comprising:

(a) means for periodically securing the engaged profiles together as said film moves along said path;

(b) means for frictionally engaging an area of the film near said profiles; and (c) means for forcing said film away from said profiles at said area of the film and disengaging at least a part of said profiles;

whereby said elongated tubing can be subsequently sealed and cut into bags with at least partially open mouths.

18. The improved apparatus of claim 16 where the means for periodically securing is a means for fusing the engaged profiles together.

19. The improved apparatus of claim 16 where the means for periodically securing is a means for mechanically fastening the engaged profiles together.

20. The improved apparatus of claim 16 where the means for frictionally engaging is a rubber tip.

21. The improved apparatus of claim 16 where the means for forcing is a piston and cylinder.

22. In an apparatus for making recloseable plastic bags from a continuous sheet of plastic material having at least one strip of mutually engaged profiles where the mouths of the bags are at least partially open, said apparatus including means for guiding said sheet and profiles along a longitudinal path, the improvement comprising:

(a) a spot welder mounted along said longitudinal path whereby said welder can place a spot seal in said sheet or profiles to periodically secure said profiles together;

(b) a piston and cylinder mounted along said longitudinal path and in a position so that the shaft of said piston can obliquely strike said sheet in a location between said spot seals when said piston is activated; and (c) a rubber stub mounted on said shaft whereby said stub can catch said sheet and force it in a direction away from said profiles;

whereby said sheet and profiles can be subsequently sealed and cut into bags with at least partially open mouths.

* * * * *